United States Patent
Kojima et al.

[11] Patent Number: 6,042,951
[45] Date of Patent: Mar. 28, 2000

[54] CERAMIC-COATED BLADE OF GAS TURBINE AND METHOD OF PRODUCING SAME

[75] Inventors: Yoshitaka Kojima; Hideyuki Arikawa, both of Hitachi; Mitsuo Haginoya, Ibaraki-ken; Katsuo Wada, Hitachi; Ryuta Watanabe, Mobara; Yoshiaki Matsushita; Shin Yoshino, both of Tokyo, all of Japan

[73] Assignees: Hitachi, Ltd.; The Tokyo Electric Power Co., Inc., both of Tokyo, Japan

[21] Appl. No.: 09/017,320

[22] Filed: Feb. 2, 1998

[30] Foreign Application Priority Data

Feb. 6, 1997 [JP] Japan .................................. 9-023434

[51] Int. Cl.[7] ...................................................... B32B 17/06
[52] U.S. Cl. ................. 428/633; 416/241 R; 416/241 B; 428/469; 428/472; 428/697; 428/699; 428/701; 428/621; 428/632
[58] Field of Search ..................................... 428/701, 697, 428/699, 469, 472, 621, 632, 633; 416/241 B, 241 R

[56] References Cited

U.S. PATENT DOCUMENTS

| 4,344,904 | 8/1982 | Yamada et al. ........................ 501/103 |
| 4,495,907 | 1/1985 | Kamo .................................... 123/193 C |
| 4,503,130 | 3/1985 | Bosshart et al. . |
| 4,916,022 | 4/1990 | Solfest et al. ........................ 416/241 B |
| 5,059,095 | 10/1991 | Kushner et al. ..................... 416/241 B |
| 5,080,977 | 1/1992 | Zaplatynsky .............................. 428/469 |

FOREIGN PATENT DOCUMENTS

| 5-279832 | 10/1993 | Japan . |
| 6-256926 | 9/1994 | Japan . |
| 8-20878 | 1/1996 | Japan . |
| 8-27559 | 1/1996 | Japan . |
| 2 252 567 | 8/1992 | United Kingdom . |

OTHER PUBLICATIONS

The Transactions of the ASME Discussion 91–GT–40.
Small Committee Research Report of Heat Resistant Metallic Materials, 1996, vol. 36, No. 3, pp. 475–478.

*Primary Examiner*—Archene Turner
*Attorney, Agent, or Firm*—Beall Law Offices

[57] ABSTRACT

A ceramic-coated blade of a gas turbine and a method of producing the same, in which the thickening of an $Al_2O_3$ layer at the interface between a ceramic layer and a primary layer is sufficiently prevented for a long period of time, thereby positively suppressing the separation of the ceramic layer. Using powder of MCrAlY alloy (Co-32% Ni-21% Cr-8% Al-0.5% Y), a primary layer (alloy coating layer) is formed on a surface of a substrate made of a heat-resistant Ni base alloy (Rene'-80). Further, a heat-resistant ceramic layer, comprising a mixture of ion-conductive $ZrO_2$-8 wt. % $Y_2O_3$ ceramic and insulative ceramic (e.g. $Al_2O_3$), is formed on the alloy coating layer. This mixture has a columnar structure in which columnar crystals are grown by a gas phase in a direction of a thickness of the coating, or a porous structure in which flattened particles brought about from molten particles caused to fly at high velocity are laminated.

3 Claims, 1 Drawing Sheet

CERAMIC-COATED BLADE OF GAS TURBINE AND METHOD OF PRODUCING SAME

BACKGROUND OF THE INVENTION

This invention relates to a blade of a gas turbine having a novel heat-resistant ceramic coating layer, and also to a method of producing such a blade.

In a power-generating gas turbine, in order to enhance the power-generating efficiency, it is essential to achieve a high operating temperature and also to reduce the amount of a cooling medium, and it has been earnestly desired to enhance the high-temperature durability of turbine blades. In addition, in order to reduce the running cost of the gas turbine, it has been essential to prolong the service life of the turbine blades. Under the circumstances, heat-resistant materials, having high-temperature strength and excellent reliability, have been developed, but the heat resistance of the material itself is limited. Therefore, a thermal barrier coating (hereinafter often referred to as "TBC") has been proposed in order to reduce the substrate metal temperature of the blade used under high temperature conditions, and by using the TBC in combination with the cooling of the blades, the substrate metal temperature can be made 50 to 200° C. lower than that achieved without the TBC.

However, the TBC, used under severe thermal load conditions, is susceptible to damage such as the separation of a ceramic layer, and this damage is conspicuous particularly in a high-temperature gas turbine designed to achieve the enhanced power-generating efficiency. Therefore, various TBCs, having further improved durability, have been proposed, and examples of such prior art techniques are as follows.

(1) U.S. Pat. No. 4,503,130

In these prior art techniques, there are disclosed a TBC of a columnar structure having a columnar-crystal ceramic layer having a thermal stress relaxation function, and a TBC of a porous structure having a porous ceramic layer, and damage due to the thermal expansion difference between the ceramic layer and heat-resistant alloy constituting the substrate, is prevented.

More specifically, the ceramic layer is composed of a $ZrO_2$ ceramic material which has low thermal conductivity and high thermal expansion, and has excellent stability at high temperature. In this case, when $ZrO_2$ is used alone, damage due to a dimensional change, caused by phase transformation, is encountered, and therefore stabilized $ZrO_2$, which is prevented from phase transformation by the addition of a crystal structure-stabilizing agent (such as $Y_2O_3$, CaO, MgO, $CeO_2$, $Sc_2O_3$), or partially-stabilized $ZrO_2$ is used. With respect to the structure of the ceramic layer, the columnar structure or the porous structure is used. The TBC comprises the ceramic layer and a primary coat (underlayer) for this ceramic layer, and as the primary coat or layer, there is used MCrAlY alloy (M is one of Co, Ni, Fe or a combination thereof), having excellent high temperature oxidation resistance and corrosion resistance, or MCrAlY alloy whose surface portion is made rich in Al. In one example, the surface of the primary layer (i.e., underlayer) is beforehand oxidized to form a thin layer of $Al_2O_3$.

In the case of using such TBC in a blade of a high-temperature gas turbine, the TBC is applied to blades having a cooling function, so as to achieve a thermal barrier effect. More specifically, the temperature of combustion gas is high on the blades of the high-temperature gas turbine, and therefore the cooling performance of the blades is high, and the quantity of heat (heat flux), penetrating the blade, becomes large. As a result, in the TBC provided on the surface of the blade, the thermal barrier effect is enhanced because of the large heat flux, and the effect of the TBC is enhanced. As the heat flux increases, the temperature of the ceramic layer, constituting the outermost layer of the TBC, rises. As a result, the oxygen ion conductivity of the $ZrO_2$ ceramic, which is its inherent property, becomes higher, and the supply of oxygen to the surface of the primary layer (underlayer) through the ceramic layer increases, so that an oxidation reaction at the surface of the primary layer is promoted. Here, the primary layer comprises the MCrAlY alloy layer, and this alloy layer has the function of preventing damage due to the oxidation reaction. Particularly at high temperatures, Al, contained in the alloy, is oxidized into $Al_2O_3$, and this $Al_2O_3$ forms the barrier layer to prevent the internal oxidation of the alloy itself. Incidentally, ceramic members, having a TBC similar in structure to the above TBC, are disclosed, for example, in Japanese Patent Unexamined Publication Nos. 6-256926 and 8-27559.

(2) Japanese Patent Unexamined Publication No. 5-279832

In this prior art technique, a MCrAlY alloy layer is formed on a substrate, and a porous ceramic layer of a molten particle laminate structure is formed by spraying on this alloy layer, and pores in this ceramic layer are filled with $Al_2O_3$, and by doing so, the internal destruction due to thermal stress relaxation is prevented.

(3) Japanese Patent Unexamined Publication No. 8-20878

In this prior art technique, a MCrAlY alloy layer is formed on a substrate, and a porous ceramic layer of a molten particle laminate structure formed by spraying, or a ceramic layer of a columnar structure formed by electron beams is formed on this alloy layer, and a thin coating of $Al_2O_3$ is formed on the surface of the ceramic layer, and by doing so, the oxygen permeability in the ceramic layer is lowered, thereby enhancing the durability.

However, the above prior art techniques have the following problems.

In the TBC of the prior art technique (1) and the ceramic member having this TBC, the $Al_2O_3$ barrier layer is formed by Al contained in the MCrAlY alloy layer, and therefore under conditions in which the oxidation is promoted at high temperatures, the thickness of the $Al_2O_3$ layer is increased by Al of the $Al_2O_3$ layer or by diffusion of oxygen. Therefore, for example, when this material is used in a high-efficiency power-generating gas turbine having high operation temperature, since there occur severe thermal load conditions in which the starting operation, the longtime holding of the steady state, and the stop are repeated, damage is caused in the vicinity of the $Al_2O_3$ layer by thermal stresses of the heat cycle due to the increase in thickness of the $Al_2O_3$ layer, and the separation of the ceramic layer is liable to occur in the vicinity of the boundary between the ceramic layer and the primary layer ($Al_2O_3$ layer), which leads to a fear that the thermal barrier effect, which is the originally-intended purpose, is not satisfactorily achieved. Namely, in the prior art technique (1), no consideration is given to the prevention of the thickening of the $Al_2O_3$ layer due to the increased oxygen-ion-conductivity of the $ZrO_2$ ceramic layer at high temperatures so as to suppress the separation of the ceramic layer.

Incidentally, it has been reported that such damage, developing in the vicinity of the $Al_2O_3$ layer formed at the interface of the primary layer and the ceramic layer, can also occur in a TBC in which a ceramic layer is of a columnar structure and which has a thermal stress relaxation function (Report of ASME meeting, 1991-GT-40). Further, it has been reported that in a porous ceramic layer formed by plasma a spraying, a thickened $Al_2O_3$ layer at the interface determines the lifetime (durability) of a TBC ("Study of Estimated lifetime of Gas Turbine Barrier Coating" in Research Report vol. 36, No. 3, p475 by No. 123 Small Committee Research Report of Heat Resistant Metallic Materials; 1996).

In the prior art technique (2), as described above for the prior art technique (1), no consideration is given to the prevention of the thickening of the $Al_2O_3$ layer due to the increased oxygen-ion-conductivity of the $ZrO_2$ ceramic layer at high temperatures so as to suppress the separation of the ceramic layer. It may be thought that the structure, in which the pores in the ceramic layer are filled with $Al_2O_3$ for the purpose of preventing the internal destruction due to thermal stress relaxation, somewhat suppresses the thickening of the $Al_2O_3$ layer due to the increased oxygen-ion-conductivity. However, since only the pores are filled with $Al_2O_3$, its effect is insufficient. This prior art publication does not disclose the thickening of the $Al_2O_3$ layer which thickening is caused by the enhanced oxygen ion conductivity of the porous ceramic layer.

In the prior art technique (3), in both of the porous ceramic layer of a molten particle laminate structure and the ceramic layer of a columnar structure, consideration is given to the prevention of the increase in the oxygen-ion-conductivity of the $ZrO_2$ ceramic layer at high temperatures. However, when this coating layer is used for a blade of a gas turbine, a lot of dust, including iron rust contained in combustion gas, flows and impinges on the coating layer (this is known as "erosion"), and therefore the $Al_2O_3$ layer on the surface thereof is scraped off by this dust, so that the satisfactory effect can not be obtained for a long period of time.

SUMMARY OF THE INVENTION

It is an object of this invention to provide a ceramic-coated blade of a gas turbine in which the thickening of an $Al_2O_3$ layer at the interface of a ceramic layer and a primary layer is sufficiently prevented for a long period of time, thereby positively suppressing the separation of the ceramic layer.

Another object of the invention is to provide a method of producing such a ceramic-coated blade.

According to the present invention, there is provided a ceramic-coated blade of a gas turbine and a method of producing the same, wherein the blade comprises: a substrate made of a heat-resistant alloy comprising Ni as a main component; an alloy coating layer which is formed on a surface of the substrate and which is made of a material superior in high-temperature oxidation and corrosion resistance to the heat-resistant alloy; and a heat-resistant ceramic layer formed on the alloy coating layer, wherein the heat-resistant ceramic layer is a mixture of ion-conductive ceramic, composed of at least partially-stabilized $ZrO_2$ ceramic, and insulative ceramic; and the mixture has a columnar structure in which columnar crystals are grown in a direction of a thickness of the coating, or a porous structure in which breadths of flattened particles are laminated in the direction of the thickness of the coating, and the former is formed by a gas phase, and in the latter, molten particles are caused to fly at high velocity so as to form the latter structure.

The heat-resistant ceramic layer of the present invention has the porous structure formed by a molten phase produced by plasma spraying or the like, or the columnar structure formed by a gas phase produced by electron beam vapor deposition or the like.

(1) Porous Structure

In this case, the heat-resistant ceramic layer has the porous structure in which the flattened particles in the direction of the thickness of the coating are laminated, with residual pores intervening there-between. Conventionally, in this structure, oxygen intrudes through defects of the porous ceramic layer, and also oxygen is supplied to the interface of the heat-resistant ceramic layer and the primary layer because of the oxygen ion conductivity of the $ZrO_2$ ceramic, so that Al, contained in MCrAlY alloy constituting the primary layer, is changed into $Al_2O_3$ by an oxidation reaction at the interface.

In the present invention, however, the heat-resistant ceramic layer comprises a mixture formed by adding insulative ceramic, such as $Al_2O_3$, to $ZrO_2$ ceramic, and therefore the oxygen ion conductivity of the heat-resistant ceramic layer is greatly lowered, and hence the oxidation reaction at the interface is markedly suppressed. As a result, even when the blade is used under high-temperature conditions for a long period of time, the thickening of the $Al_2O_3$ layer, formed at the interface of the ceramic layer and the primary layer, is prevented. In this case, in the present invention, the pores in the porous structure remain, and the porous structure is formed by the mixture of the $ZrO_2$ ceramic and the insulative ceramic, with the pores intervening therebetween. Namely, since the insulative ceramic is filled uniformly in all portions except the pores, the marked effect of reducing the oxygen ion conductivity can be obtained.

The morphology of presence of the insulative ceramic in the heat-resistant ceramic layer of such a porous structure may be one in which each of the flattened particles is in the form of mixture, or one in which the flattened particles of $ZrO_2$ ceramic and the flattened particles of $Al_2O_3$ or the like are mixed and laminated. In the case where the individual flattened particle is formed by the mixture, the oxygen ion conductivity of the individual particles is lowered. On the other hand, in the case of the structure in which the $ZrO_2$ particles and the $Al_2O_3$ particles are mixed together, the oxygen ion conductivity is lowered through the laminated particles. Of course, even with a structure in which the two mixture states are combined together, the effect of reducing the oxygen ion conductivity can be obtained.

Examples of methods of forming the ceramic layer, in which the $ZrO_2$ ceramic and the insulative ceramic are mixed together, include a method in which a raw material of powder particles in a mixed state is sprayed, another method in which a powder mixture of $ZrO_2$ and $Al_2O_3$ or the like is sprayed as raw material, still another method in which $Al_2O_3$ or a metallic element constituent (Al) of $Al_2O_3$ is coated on a surface of each $ZrO_2$ particle, and these composite powder particles are sprayed as a raw material, and still another method in which the powder particles, combined together by the above methods, are sprayed as a raw material.

(2) Columnar Structure

In this case, the heat-resistant ceramic layer has the columnar structure in which the columnar crystals are grown in the direction of the thickness of the coating. Generally, conventionally, in this structure, since no particle boundary acting as barrier to oxygen ion conduction exists, the oxidation reaction, occurring at the interface of the heat-resistant ceramic layer and the primary layer by the oxygen ion conductivity as described above for the structure (1), tends to become very large in comparison with the porous structure in which the flattened particles are laminated.

In the present invention, however, the heat-resistant ceramic layer comprises the mixture formed by adding the insulative ceramic, such as $Al_2O_3$, to $ZrO_2$ ceramic, and therefore the oxygen ion conductivity of the heat-resistant ceramic layer of the columnar structure is greatly lowered, and hence the effect of suppressing the oxidation reaction at the interface is greatly enhanced. As a result, even when the blade is used under high-temperature conditions for a long period of time, the thickening of the $Al_2O_3$ layer, formed at the interface of the ceramic layer and the primary layer, is prevented.

Examples of methods of forming such a heat-resistant ceramic layer include one in which $ZrO_2$ ceramic and the insulative ceramic are simultaneously vapor deposited, and one in which the two ceramics are vapor deposited alternately. In either of the two methods, the heat-resistant ceramic layer, constituting the columnar structure, can be formed into a structure in which the $ZrO_2$ ceramic and the insulative ceramic (e.g. $Al_2O_3$) are mixed together, and even at a nano order level, the two can be mixed generally uniformly, or can be alternately laminated in the form of crystals.

Preferably, the amount of the insulative ceramic contained in the heat-resistant ceramic layer is 5 to 50 wt. %.

The range of the insulative ceramic content of the heat-resistant ceramic layer of the present invention should fundamentally be determined by the oxygen ion conductivity of the $ZrO_2$ ceramic at high temperatures. However, it is the most significant that the oxygen ion conductivity-reducing effect of the present invention should be determined upon studying the thickness of the $Al_2O_3$ layer at the interface of the heat-resistant ceramic layer and the primary layer in the TBC when it is heated at high temperature for a long period of time. Therefore, the optimum range of the amount of addition of the insulative ceramic can be determined by relation between the thickness of the $Al_2O_3$ layer at the interface in the TBC and the amount of addition of the insulative ceramic. Based on this concept, the 5 to 50 wt. % insulative material content is effective for preventing the thickening of the $Al_2O_3$ layer at the interface, and further with the 10 to 40 wt. % content, its effect is the most effective. One reason for this is that if the addition amount is less than 5 wt. %, the oxygen ion conductivity-reducing effect is low, and as a result the effect of suppressing an oxidation at the interface is low, so that the thickening of the $Al_2O_3$ layer can not be sufficiently prevented. Another reason is that if the content is more than 50 wt. %, the oxygen ion conductivity-reducing effect by the insulative ceramic becomes generally constant, and is not much lowered, whereas the thermal physical properties (thermal conductivity, thermal expansion, specific heat, irradiation and etc.), inherent to the insulative ceramic, become conspicuous as thermal characteristics of the ceramic layer, so that the thermal physical properties, inherent to the $ZrO_2$ ceramic, are varied, thereby adversely affecting excellent thermal characteristics of the ceramic for a TBC. Therefore, preferably, the amount of addition of the insulative ceramic of the TBC ceramic of the present invention is in the range of from 5 wt. % to 50 wt. %.

Preferably, the insulative ceramic contains at least one of $Al_2O_3$, $SiO_2$, $Hf_2O_3$, BN, AlN and $Si_3N_4$.

Preferably, the ion-conductive ceramic contains $ZrO_2$ as a main component, and further contains at least one of $Y_2O_3$, CaO, $CeO_2$ and MgO, and preferably the amount of the at least one substance is 4 to 12 wt. %, and more preferably 6 to 10 wt. %.

Figure 1:
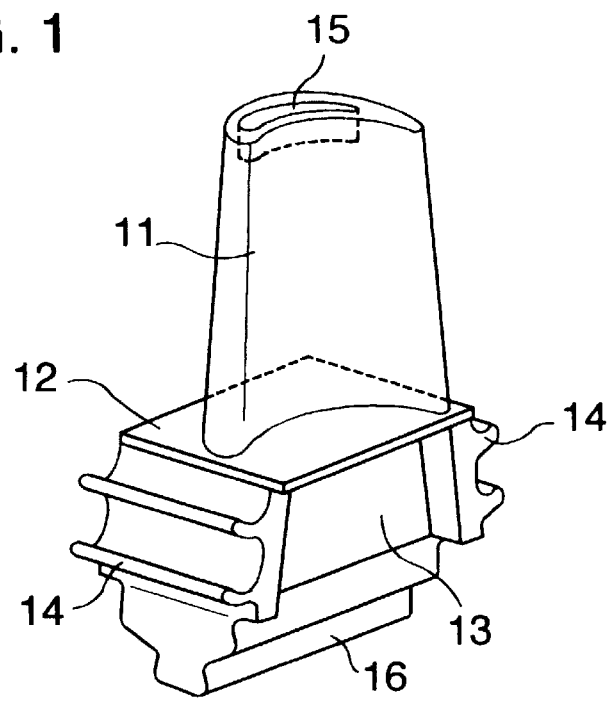
FIG. 1 is a perspective view showing an overall construction of a blade of a gas turbine according to a first embodiment of the present invention.

DESCRIPTION OF THE PREFERRED EMBODIMENTS (1) Preparation of Test Pieces

Using $ZrO_2$-8 wt. % $Y_2O_3$ (as partially-stabilized $ZrO_2$) and $Al_2O_3$ (as insulative ceramic), test pieces of a porous structure were prepared by plasma spraying, and also test pieces of a columnar structure were prepared by electron beam vapour deposition. In this manner, TBCs of this embodiment were formed.

More specifically, heat-resistant Ni base alloy (Rene'-80: Ni-14% Cr-4% Mo-4% W-3% Al-5% Ti-9.5% Co) was used as a substrate, and a primary layer (alloy coating layer) was formed on a surface of the substrate by plasma spraying in a reduced pressure atmosphere, using powder of MCrAlY alloy (Co-32% Ni-21% Cr-8% Al-0.5% Y) having high-temperature oxidation and corrosion resistance superior to the heat-resistant Ni base alloy (Rene'-80). With respect to conditions of this process, the alloy powder was charged into a plasma jet (50 KW) formed by the use of a mixture gas of Ar-7% $H_2$, and was sprayed, and an atmosphere pressure during the spraying was about 50 Torr. In this case, the substrate was subjected to pretreatments, and more specifically the substrate was degreased and rinsed, and was subjected to blasting, using a grid made of $Al_2O_3$. The thickness of the formed primary coat was about 150 $\mu$m. The test pieces of the porous structure, formed by plasma spraying, and the test pieces of the columnar structure, formed by electron beam vapour deposition, will be described below separately from each other.

(1-1) Test Pieces of Porous Structure by Plasma Spraying

With respect to the TBC test pieces (of this Embodiment) of the porous structure by plasma spraying, a heat-resistant ceramic layer, having a thickness of 250 $\mu$m, was formed on the substrate with the primary layer, by plasma spraying in the atmospheric air. With respect to conditions of the plasma spraying in the atmospheric air, ceramic powder was charged into a plasma jet (45 KW) formed by the use of the Ar-7% $H_2$ mixture gas, and was sprayed. Here, two kinds of ceramic powders were used. One is composite oxide powder formed by adding (2.5, 5, 10, 30, 40, 50, 60) wt. % $Al_2O_3$ (serving as insulative ceramic) to $ZrO_2$-8 wt. % $Y_2O_3$ ceramic (serving as ion-conductive ceramic), and the other was a powder mixture of $ZrO_2$-8 wt. % $Y_2O_3$ ceramic powder and $Al_2O_3$ powder (serving as insulative ceramic) (the mixture ratio: 10, 30 wt. % $Al_2O_3$). The composite oxide was formed by integrally combining the ion-conductive ceramic and the insulative ceramic together by melting or sintering. As a result, the heat-resistant ceramic layer, formed through melting by plasma spraying, became a mixture of the ion-conductive ceramic and the insulative ceramic, formed by adding $Al_2O_3$ to $ZrO_2$-8 wt. % $Y_2O_3$ ceramic, and as a result of observation of a cross-sectional structure, each test piece had a porous structure in which flattened particles are laminated, with residual pores intervening therebetween.

(1-2) Test Pieces of Columnar Structure by Electron Beam Deposition

With respect to the TBC test pieces (of this Embodiment) of the columnar structure formed by electron beam vapour deposition, some of these test pieces were previously subjected to blasting so that the primary layers could have surface roughness of Rmax. 65 μm while the other test pieces were subjected to peening so that the primary layers could have surface roughness of Rmax. 10 μm. With respect to conditions of the electron beam deposition, a chamber with ultimate vacuum of $10^{-6}$Torr was used, and a raw material for vapour deposition purposes was melted by an electron beam of 16 KW, and was vapor-deposited on the surface of the substrate with the primary layer, under vacuum of $5\times10^{-5}$Torr to form a heat-resistant ceramic layer having a thickness of about 200 μm. The temperature of the substrate was about 850° C. during the formation of the coating. In the formation of the ceramic layer, there was used a binary deposition method in which $ZrO_2$-8 wt. % $Y_2O_3$ and $Al_2O_3$ were used as raw materials, and the desired vapour deposition amount for each test piece was obtained by controlling the electron beam output, using a coating thickness monitor. The heat-resistant ceramic layer of $ZrO_2$-8 wt %. $Y_2O_3$ and $Al_2O_3$ (the mixture ratio: 2.5, 5, 10, 25, 40, 50, 60 wt. % $Al_2O_3$) was formed on those test pieces with the primary layers having the surface roughness of Rmax. 65 μm. Also, the ceramic layer (the mixture ratio: 0, 10, 25 wt. % $Al_2O_3$) was formed on those test pieces with the primary layers having the surface roughness of Rmax. 65 μm. As a result, the heat-resistant ceramic layer, formed by this electron beam vapour deposition method, became a mixture of ion-conductive ceramic ($ZrO_2$-8 wt. % $Y_2O_3$) and insulative ceramic ($Al_2O_3$). As a result of observation of a cross-section and a broken surface of the heat-resistant ceramic layers, those ceramic layers, formed on the primary layer having the surface roughness of Rmax. 10 μm, had a columnar structure comprising columnar structures of several μm width, and those ceramic layers, formed on the primary layer having the surface roughness of Rmax. 65 μm, had a columnar structure comprising columnar structures (primary columnar structures) of several μm width, and columnar structures (secondary columnar structures) of several tens of μm.

In the case of the ceramic layer of such a columnar structure, before the formation of the $ZrO_2$ ceramic layer, only $Al_2O_3$ was vapor-deposited to form a layer (having a thickness of about 0.5 μm) composed solely of $Al_2O_3$. In the formation of some of the ceramic layers ($ZrO_2$-8 wt. % $Y_2O_3$ and 10, 40 wt. % $Al_2O_3$), no $Al_2O_3$ layer was formed, but the $ZrO_2$ ceramic layer was formed directly on the primary layer (, that is, the under-layer).

On the other hand, there was performed another vapour deposition method in which a mixture of $ZrO_2$-8 wt. % $Y_2O_3$ and $Al_2O_3$ was used as a vapour deposition raw material for forming the ceramic layer. In this cases, the mixture ratio of $Al_2O_3$ was (5, 10, 25) wt. %, and vapour deposition conditions are the same as described above for the binary vapour deposition, and the thickness of the ceramic layer was about 200 μm. In this case, however, the number of the vapour deposition source is only one, and the control of the amount of deposition of $ZrO_2$-8 wt. % $Y_2O_3$ and $Al_2O_3$ by the coating thickness monitor was not necessary. In the TBCs formed by this method, before the formation of the $ZrO_2$ ceramic layer, the $Al_2O_3$ layer was formed as described above.

(1-3) Test Pieces formed by use of both Electron Beam Deposition and Ion Beam Irradiation There was carried out a further vapour deposition method using a combination of the above-mentioned electron beam deposition and ion beam deposition. In this method, the electron beam deposition method and conditions thereof are the same as described above, but irradiation of an oxygen ion beam of 5 KeV was further applied to the surface of the substrate. More specifically, in this method, before the electron beam deposition, only the irradiation of an oxygen ion beam was applied to thereby clean the surface of the primary layer through the sputtering thereof brought about the ion beam, and further oxygen ions were poured into the surface of the primary layer to thereby form $Al_2O_3$ at a surface portion of the primary layer. Thereafter, the electron beam deposition was effected while applying the irradiation of the ion beam, thereby forming a ceramic layer having a thickness of about 200 μm. A mixture of $ZrO_2$-8 wt. % $Y_2O_3$ and $Al_2O_3$ was used as a vapour deposition raw material for forming the ceramic layer. The mixture ratio of $Al_2O_3$ was (5, 10, 25) wt. %. In this method, the test pieces, having the primary layers having the surface roughness of Rmax. 10 μm, were used, and therefore as a result of observation of a cross-section and a broken surface of the ceramic layers, each of the ceramic layers had a columnar structure of several μm width.

(2) Heating Test in Atmosphere

In order to prove the effect of reducing the oxygen-ion-conductivity of the heat-resistant ceramic layer, the inventors of the present invention performed a high-temperature, long-term heating test for the various TBC test pieces formed by the various methods described in the above Item (1). With respect to the specification of the TBC test pieces, test piece Nos. 1 to 9 had the TBC having the ceramic layer formed by plasma spraying, using the composite powder formed by adding $Al_2O_3$ to $ZrO_2$-8 wt. % $Y_2O_3$, and test piece Nos. 11 and 12 had the ceramic layer formed by the powder mixture of $ZrO_2$-8 wt. % $Y_2O_3$ powder and $Al_2O_3$ powder, and test piece Nos. 21 to 28, 31 to 33 and 41 to 43 had the ceramic layer of the columnar structure formed by binary vapour deposition of $ZrO_2$-8 wt. % $Y_2O_3$ and $Al_2O_3$, and test piece Nos. 21 to 28 had the primary layer with the surface roughness of Rmax. 10 μm, having the 0.5 μm thick $Al_2O_3$ layer formed on the surface of the primary layer (the underlayer), and test piece Nos. 31 to 33 had no $Al_2O_3$ layer, and test piece Nos. 41 to 43 had the primary layer having the surface roughness of Rmax. 65 μm with no $Al_2O_3$ layer. Test piece Nos. 51 to 53 had the ceramic layer formed by vapour deposition while using the mixture of $ZrO_2$-8 wt. % $Y_2O_3$ and $Al_2O_3$ as the raw material, and test piece Nos. 61 to 63 had the ceramic layer formed by effecting both the vapour deposition and the oxygen ion irradiation simultaneously. With respect to the heat-resistant ceramic layer of some of the test pieces, the formed ceramic layer was analyzed in order to examine the $Al_2O_3$ content. With respect to the heating test conditions, the heating temperature was 1,100° C., and the heating time was 100 hours. Results of this test are shown in Table 1.

TABLE 1

| No. | Coating forming method | Surface roughness of primary layer | Structure of ceramic layer | Al$_2$O$_3$ content in ceramic layer (wt. %) Target value | Al$_2$O$_3$ content in ceramic layer (wt. %) Analyzed value | Thickness of Al$_2$O$_3$ layer at interface ($\mu$m) Before test | Thickness of Al$_2$O$_3$ layer at interface ($\mu$m) After test | Heat-resistant ceramic layer |
|---|---|---|---|---|---|---|---|---|
| 1 | Plasma spraying | — | Porous | 0 | — | 0 | 8 | ZrO$_2$—Y$_2$O$_3$— |
| 2 | " | — | " | 2.5 | 2.5 | 0 | 8 | Al$_2$O$_3$ powder |
| 3 | " | — | " | 5 | 5 | 0 | 5 | |
| 4 | " | — | " | 10 | — | 0 | 5 | |
| 5 | " | — | " | 30 | — | 0 | 4 | |
| 6 | " | — | " | 40 | 40 | 0 | 3 | |
| 7 | " | — | " | 50 | 50 | 0 | 3 | |
| 8 | " | — | " | 60 | 60 | 0 | 3 | |
| 11 | " | — | " | 10 | 20 | 0 | 4 | Powder |
| 12 | " | — | " | 30 | 45 | 0 | 3 | mixture of ZrO$_2$—Y$_2$O$_3$ and Al$_2$O$_3$ |
| 21 | EB deposition | 10 $\mu$m | Columnar | 0 | — | 0.5 | 10 | Binary |
| 22 | " | 10 $\mu$m | " | 2.5 | 2.5 | 0.5 | 9 | deposition |
| 23 | " | 10 $\mu$m | " | 5 | 5 | 0.5 | 6 | of ZrO$_2$—Y$_2$O$_3$ |
| 24 | " | 10 $\mu$m | " | 10 | — | 0.5 | 5 | and Al$_2$O$_3$ |
| 25 | " | 10 $\mu$m | " | 25 | 25 | 0.5 | 4 | |
| 26 | " | 10 $\mu$m | " | 40 | — | 0.5 | 3 | |
| 27 | " | 10 $\mu$m | " | 50 | 50 | 0.5 | 2 | |
| 28 | " | 10 $\mu$m | " | 60 | 60 | 0.5 | 2 | |
| 31 | " | 10 $\mu$m | " | 0 | — | 0 | 10 | |
| 32 | " | 10 $\mu$m | " | 10 | — | 0 | 6 | |
| 33 | EB deposition | 10 $\mu$m | Columnar | 25 | — | 0 | 4 | |
| 41 | " | 65 $\mu$m | " | 0 | — | 0 | 10 | |
| 42 | " | 65 $\mu$m | " | 10 | — | 0 | 5 | |
| 43 | " | 65 $\mu$m | " | 40 | — | 0 | 3 | |
| 51 | " | 10 $\mu$m | " | 5 | 10 | 0.5 | 6 | Deposition |
| 52 | " | 10 $\mu$m | " | 10 | 18 | 0.5 | 5 | of |
| 53 | " | 10 $\mu$m | " | 25 | 35 | 0.5 | 3 | ZrO$_2$—Y$_2$O$_3$— |
| 61 | EB deposition & Ion irradiation | 10 $\mu$m | " | 5 | — | 0.5 | 5 | Al$_2$O$_3$ |
| 62 | EB deposition & Ion irradiation | 10 $\mu$m | " | 10 | — | 0.5 | 4 | |
| 63 | EB deposition & Ion irradiation | 10 $\mu$m | " | 25 | — | 0.5 | 3 | |

Heating test in atmosphere: 1100° C., 100 h, in Electric furnace

Table 1 shows the measured value of the thickness of the Al$_2$O$_3$ layer formed at the interface between the heat-resistant ceramic layer and the primary layer of each TBC test piece subjected to the test. As is clear from Table 1, with respect to the thickness of the Al$_2$O$_3$ layer formed at the interface between the ceramic layer and the primary layer, which thickness was obtained from a cross-sectional structure of the TBCs subjected to the high-temperature heating test, in the case of the ceramic (No. 1) of the porous structure containing no Al$_2$O$_3$, the Al$_2$O$_3$ layer is as thick as 8 $\mu$m, and also in the case of the ceramic (No. 21) of the columnar structure containing no Al$_2$O$_3$, the Al$_2$O$_3$ layer is as thick as 10 $\mu$m, that is, the thickness of the Al$_2$O$_3$ layer increased. On the other hand, with respect to those TBCs of this embodiment having the ceramic layer containing 5 to 50 wt. % Al$_2$O$_3$, the thickness of the Al$_2$O$_3$ layer in test piece Nos. 3 to 7, 11 and 12 of the porous structure is 5 to 3 $\mu$m, and the thickness of the Al$_2$O$_3$ layer in test piece Nos. 23 to 27, 32, 33, 42, 43, 51 to 53 and 61 to 63 of the columnar structure is 6 to 2 $\mu$m, which means that the thickening of the Al$_2$O$_3$ layer is prevented by the oxidation-suppressing effect achieved at the interface between the ceramic layer and the primary layer by the reduction of the oxygen-ion-conductivity. However, with respect to those TBCs of this embodiment having the ceramic layer containing less than 5 wt. % Al$_2$O$_3$, that is, the ceramic (No. 2) of the porous structure and the ceramic (No. 22) of the columnar structure, the effect of suppressing the thickening of the Al$_2$O$_3$ layer is insufficient. The effect of preventing the thickening of the Al$_2$O$_3$ layer, obtained when the amount of addition of Al$_2$O$_3$ is more than 50 wt. %, is not substantially different from that obtained when the amount of addition of Al$_2$O$_3$ is 50 wt. %, and thus it has been found that the addition of Al$_2$O$_3$ in an amount of more than 50 wt. % does not substantially enhance this effect. Thus, in order to obtain sufficient effect for suppressing the thickening of the Al$_2$O$_3$ layer, the addition amount of Al$_2$O$_3$ was found to be 5 to 50 wt. %.

(3) Heat Cycle Test

The primary purpose of a gas turbine blade of this embodiment is to enhance the durability of the blade at a high-temperature portion of the gas turbine which is exposed to high temperatures for a long period of time, and is subjected to thermal stresses when the operation of the gas turbine is started and stopped. Therefore, in order to prove this enhanced durability more practically, the inventors of the present invention conducted a heat cycle test for the same test pieces as prepared in the above Item (1) which heat cycle included the holding of the test pieces at a high temperature, and in this heat cycle test, a thermal load on the gas turbine blade at high temperatures was simulated. With respect to test conditions, the heating (1,050° C.) in the atmosphere and the cooling to 200° C. were repeated, and the heating time was 5 min. and the cooling time was 5 min. Each test piece was in the form of a column having a diameter of 9 mm and a length of 50 mm, and a TBC was formed on side surface of the column. For comparison purposes, a heating/cooling heat cycle test involving no holding of the test pieces at high temperatures, was also conducted. Results of this test are shown in Table 2.

high-temperature portion of the actual gas turbine was confirmed. However, in TBC test piece No. 2 of this embodiment having the ceramic layer containing less than 5 wt. % $Al_2O_3$, the enhancement of the durability is hardly seen since the oxygen ion conductivity-reducing effect is low. In these TBCs, damage developed in the ceramic layer in the vicinity of the interface between the ceramic layer and the primary layer. In TBC test piece No. 8 of this embodiment having the ceramic layer containing more than 50 wt.

TABLE 2

| No. | Coating forming method | Surface roughness of primary layer | Structure of ceramic layer | $Al_2O_3$ content (wt. %) | Repetition number before damage develops in TBC | |
|---|---|---|---|---|---|---|
| | | | | | Test A | Test B |
| 1 | Plasma spraying | - | Porous | 0 | 1200 | 3200 |
| 2 | " | — | " | 2.5 | 1300 | — |
| 3 | " | — | " | 5 | 3200 | 4800 |
| 4 | " | — | " | 10 | 3300 | — |
| 5 | " | — | " | 30 | 3200 | 4500 |
| 6 | " | — | " | 40 | 3000 | — |
| 7 | " | — | " | 50 | 3300 | — |
| 8 | " | — | " | 60 | 2100 | — |
| 11 | " | — | " | 10 | 3000 | — |
| 12 | " | — | " | 30 | 3100 | — |
| 21 | EB deposition | 10 μm | Columnar | 0 | 2000 | 35000 |
| 22 | " | 10 μm | " | 2.5 | 2500 | — |
| 23 | " | 10 μm | " | 5 | 8300 | 43000 |
| 24 | " | 10 μm | " | 10 | 8800 | — |
| 25 | " | 10 μm | " | 25 | 9300 | 45000 |
| 26 | " | 10 μm | " | 40 | 8500 | — |
| 27 | " | 10 μm | " | 50 | 7200 | — |
| 28 | " | 10 μm | " | 60 | 4500 | — |
| 31 | " | 10 μm | " | 0 | 1900 | — |
| 32 | " | 10 μm | " | 10 | 8200 | — |
| 33 | " | 10 μm | " | 25 | 8500 | — |
| 41 | " | 65 μm | " | 0 | 2100 | — |
| 42 | " | 65 μm | " | 10 | 9800 | — |
| 43 | " | 65 μm | " | 40 | 9500 | — |
| 51 | " | 10 μm | " | 5 | 8500 | — |
| 52 | " | 10 μm | " | 10 | 8800 | — |
| 53 | " | 10 μm | " | 25 | 8300 | — |
| 61 | EB deposition & Ion irradiation | 10 μm | " | 5 | 9300 | — |
| 62 | EB deposition & Ion irradiation | 10 μm | " | 10 | 9800 | — |
| 63 | EB deposition & Ion irradiation | 10 μm | " | 25 | 9500 | — |

"Repetition number before damage develops in TBC": The number of cycles before a separated area of the ceramic layer becomes not less than 20%.

Table 2 shows the repetition number before damage developed in the TBC of the TBC test pieces. When a separated area of the heat-resistant ceramic layer exceeded 20%, it was decided that damage developed, and the repetition number so far was found. As described above, with respect to some of the test pieces, not only the results of the heat cycle test (Test A), involving the holding of the test pieces at high temperatures, but also the results of the heat cycle test (Test B) involving no holding of the test pieces at high temperatures, are shown.

(3-1) Test Pieces of Porous Structure

As is clear from Table 2, in TBC test piece Nos. 3 to 7 and 11 and 12 of this embodiment including the TBC having the heat-resistant ceramic layer of the porous structure containing 5 to 50 wt. % $Al_2O_3$, the repetition number before the occurrence of the separation is much larger as compared with the conventional TBC (No. 1) comprising the ceramic layer having oxygen-ion-conductivity, and thus the enhanced durability under the thermal load condition at the % $Al_2O_3$, separation occurred in the ceramic layer under the influence of the thermal cycle characteristics of the added $Al_2O_3$.

With respect to all of the test pieces, a cross-sectional structure of a portion, in which some of the ceramic layer remained after the test, was observed, and as a result in the TBCs (Nos. 3 to 7, 11 and 12) of this embodiment, the thickness of the $Al_2O_3$ layer at the interface between the ceramic layer and the primary layer was 2 to 3 μm, whereas in the conventional TBC (No. 1) and the TBC (No. 2) of this embodiment having the ceramic layer containing less than 5 wt. % $Al_2O_3$, the thickness of the $Al_2O_3$ layer was as thick as 6 to 7 μm. In the TBC (No. 8) of this embodiment having the ceramic layer containing more than 50 wt. % $Al_2O_3$, the thickness of the $Al_2O_3$ layer was 2 μm, but damage and separation developed in the ceramic layer as described above.

Therefore, it has been found that in order to achieve the sufficiently-enhanced durability, it is more preferred that the amount of addition of $Al_2O_3$ be 5 to 50 wt. %.

As regards the heat cycle test (Test B) (involving no holding of the test pieces at a high temperature) conducted for comparison purposes, the effect of the TBCs of this embodiment was confirmed not to be so remarkable. The reason for this is as follows. In this test, there is hardly a time period during which the heat-resistant ceramic is exposed to high temperatures in one cycle, and the accumulated high-temperature heating time, causing the separation, is several hours. Therefore, in this test, the durability is not determined by damage caused by the oxidation occurring at the interface between the heat-resistant ceramic layer and the primary layer due to the oxygen-ion-conductivity of the heat-resistant ceramic, but is determined by damage caused by repeated thermal stresses due to the difference in thermal expansion coefficient between the heat-resistant layer and the substrate. Namely, this condition is greatly different from the thermal load condition for the blades in the actual gas turbine, and this test is not suitable as a test for exhibiting the effectiveness of the TBCs of this embodiment.

(3-2) Test Pieces of Columnar Structure

In TBC test piece Nos. 23 to 27, 32, 33, 42, 43, 51 to 53, and 61 to 63 of this embodiment including the TBC having the heat-resistant ceramic layer of the columnar structure containing 5 to 50 wt. % $Al_2O_3$, the repetition number before the occurrence of damage to the TBC is much larger as compared with the conventional TBCs (Nos. 21, 31 and 41) including the ceramic layer having oxygen ion conductivity, or as compared with the TBC (No. 22) of this embodiment having the ceramic layer containing less than 5 wt. % $Al_2O_3$. In the TBC of this embodiment having the ceramic layer containing more than 50 wt. % $Al_2O_3$, the durability-enhancing effect was lowered. It is thought that the reason for this is that since the main component of the ceramic layer is $Al_2O_3$, the durability is lowered by the influence of the heat-resistance cycle characteristics of $Al_2O_3$ itself.

With respect to all of the test pieces, a cross-sectional structure of a portion, at which some of the ceramic layer remained after the test, w as observed, and as a result in the TBCs (Nos. 23 to 27, 32, 33, 42, 43, 51 to 53, and 61 to 63) of this embodiment having the ceramic layer containing 5 to 50 wt. % $Al_2O_3$, the thickness of the $Al_2O_3$ layer at the interface between the ceramic layer and the primary layer was 3 to 5 $\mu$m, whereas in the conventional TBCs (Nos. 21, 31 and 41) and the TBC (No. 22) of this embodiment having the ceramic layer containing less than 5 wt. % $Al_2O_3$, the thickness of the $Al_2O_3$ layer was as thick as 9 to 10 $\mu$m. In the TBC (No. 28) of t his embodiment having the ceramic layer containing more than 50 wt. % $Al_2O_3$, the thickness of the $Al_2O_3$ layer was 3 $\mu$m, but damage and separation developed in the ceramic layer as described above.

Therefore, it has been found that in order to achieve the sufficiently-enhanced durability, it is more preferred that the amount of addition of $Al_2O_3$ be 5 to 50 wt. %.

In the heat cycle test (Test B) (involving no holding at a high-temperature) conducted for comparison purposes, the effect of the TBCs of this embodiment was not remarkable. The reason for this is as follows. In this test, there is hardly a time period during which the heat-resistant ceramic is exposed to high temperatures in one cycle, and the accumulated high-temperature heating time, causing the separation, is several tens of hours. Therefore, in this test, the durability is not determined by damage caused by the oxidation occurring at the interface between the heat-resistant ceramic layer and the primary layer due to the oxygen ion conductivity of the heat-resistant ceramic, but is determined by damage caused by repeated thermal stresses due to the difference in thermal expansion coefficient between the heat-resistant layer and the substrate. Namely, this condition is greatly different from the thermal load condition for the blades in the actual gas turbine, and this test is not suitable as a test for exhibiting the effectiveness of the TBCs of this embodiment.

Incidentally, the conditions of this test B are rather conditions suitable for evaluating the difference in thermal stress relaxation function between the heat-resistant ceramic layer of the columnar structure in the TBC and the heat-resistant ceramic layer of the porous structure in the TBC. Therefore, in the TBCs of this embodiment having the ceramic layer of the columnar structure, the thickening of the $Al_2O_3$ layer is prevented by the suppressed oxidation reaction at the interface between the heat-resistant ceramic layer and the primary layer (which suppressed reaction is caused by the reduced oxygen-ion-conductivity of the heat-resistant ceramic layer), and also the thermal stress relaxation function of the heat-resistant ceramic layer itself is achieved, so that the very excellent durability is exhibited.

(4) Preparation of Ceramic-coated Blades of Gas Turbine

Based on the study of the results of the TBCs described in the above Items (1) to (3), the inventors of the present invention prepared ceramic-coated blades of a gas turbine according to this embodiment.

FIG. 1 is a perspective view showing the overall construction of the gas turbine blade of this embodiment. In FIG. 1, this gas turbine blade is made of heat-resistant Ni base alloy (Rene'-80), and is used, for example, as a first-stage blade of a rotating portion of the gas turbine having three-stage blades. This blade includes a blade portion 11, a platform portion 12, a shank 13, seal fins 14 and a tip pocket 15, and is fixedly secured to a disk through a dovetail 16. For example, the length of the blade portion 11 of this blade is 100 mm, and the length of other portion extending from the platform portion 12 is 120 mm. A cooling hole (not shown) is formed through the dovetail 16 and the blade portion 11, and a cooling medium (particularly, the air and steam) flows through this cooling hole so as to cool the blade from the inside thereof. With respect to conditions of use of the blade, for example, the compression pressure of a compressor is 14.7, and the temperature is 400° C., and an inlet temperature of the first-stage blade is 1,300° C., and the temperature of combustion gas produced by a combustor is 1,450° C. Although this ceramic-coated blade is best suited for the first stage, it can be used as the blade of the subsequent stages.

Each of TBCs (Nos. 4, 6, 23, 27, 32, 42, 52 and 62 in Table 1), examined in the above Items (1) to (3), was formed on blade portion 11 and platform portion 12 of a gas turbine blade to be exposed to the combustion gas. Methods of forming the TBCs were the same as described above, and for forming the heat-resistant ceramic (coating) layer, the plasma spraying (Nos. 4 and 6 in Table 1), the electron beam vapour deposition (Nos. 23, 27, 32, 42 and 52), and a combination of the electron beam deposition and the ion beam irradiation (No. 62 in Table 1) were used. Coating-forming conditions were the same as described above. For comparison purposes, there were also prepared a blade, having a heat-resistant ceramic layer formed by plasma spraying (No. 1 in Table 1), and a blade having a heat-resistant ceramic layer formed by electron beam vapour deposition (No. 21 in Table 1). The specification of the thus prepared heat-resistant ceramic layers of the ceramic-coated blades is shown in Table 3.

TABLE 3

| Blade No. | Coating forming method | Surface roughness of primary layer | Structure of ceramic layer | $Al_2O_3$ content in ceramic layer (wt. %) Target value | Composition of heat-resistant ceramic-coating layer |
|---|---|---|---|---|---|
| B-1 | Plasma spraying | | Porous | 10 | $ZrO_2$—$Y_2O_3$—$Al_2O_3$ powder |
| B-2 | " | " | " | 40 | |
| B-3 | EB deposition | 10 μm | Columnar | 5 | Binary deposition of $ZrO_2$—$Y_2O_3$ and $Al_2O_3$ |
| B-4 | " | 10 μm | " | 50 | |
| B-5 | " | 10 μm | " | 10 | |
| B-6 | " | 65 μm | " | 10 | |
| B-7 | " | 10 μm | " | 10 | Deposition of $Zro_2Y_2O_3$—$Al_2O_3$ |
| B-8 | EB deposition & Ion irradiation | 10 μm | " | 10 | |
| B-11 | Plasma spraying | | Porous | 0 | $ZrO_2$—$Y_2O_3$—$Al_2O_3$ powder |
| B-13 | EB deposition | 10 μm | Columnar | 0 | Binary deposition of $ZrO_2$—$Y_2O_3$ and $Al_2O_3$ |

As shown in Table 3, with respect to the relation between blade Nos. and test piece Nos. in the above Items (1) to (3), blade Nos. 1 to 8 correspond to test piece Nos. 4, 6, 23, 27, 32, 42, 52 and 62, respectively, and blade No. 11 corresponds to test piece No. 1, and blade No. 13 corresponds to test piece No. 21.

(5) Heating Test of Blades in Atmosphere

A heating test (heating temperature: 1,100° C.; heating time: 100 h) in the atmosphere was conducted for the ceramic-coated blades, prepared by the methods of the above Item (4), in the same manner as described above for the above Item (2). Results of this test are shown in Table 4.

TABLE 4

| Blade No. | Observed portion No. | Thickness of $Al_2O_3$ at interface (μm) | |
|---|---|---|---|
| | | Before test | After test |
| B-1 | a | 0 | 5 |
| | b | 0 | 5 |
| | c | 0 | 4 |
| | d | 0 | 5 |
| | e | 0 | 5 |
| B-2 | a | 0 | 3 |
| | b | 0 | 3 |
| | c | 0 | 4 |
| | d | 0 | 3 |
| | e | 0 | 3 |
| B-3 | a | 0.5 | 6 |
| | b | 0.5 | 5 |
| | c | 0.5 | 5 |
| | d | 0.5 | 6 |
| | e | 0.5 | 6 |
| B-4 | a | 0.5 | 3 |
| | b | 0.5 | 2 |
| | c | 0.5 | 2 |
| | d | 0.5 | 2 |
| | e | 0.5 | 3 |
| B-5 | a | 0 | 5 |
| | b | 0 | 6 |
| | c | 0 | 6 |
| | d | 0 | 5 |
| | e | 0 | 5 |
| B-6 | a | 0.5 | 5 |
| | b | 0.5 | 4 |
| | c | 0.5 | 5 |
| | d | 0.5 | 4 |
| | e | 0.5 | 4 |
| B-7 | a | 0.5 | 5 |
| | b | 0.5 | 4 |
| | c | 0.5 | 4 |
| | d | 0.5 | 5 |
| | e | 0.5 | 5 |
| B-8 | a | 0.5 | 4 |
| | b | 0.5 | 4 |
| | c | 0.5 | 3 |
| | d | 0.5 | 4 |
| | e | 0.5 | 4 |
| B-11 | a | 0 | 7 |
| | b | 0 | 8 |
| | c | 0 | 8 |
| | d | 0 | 8 |
| | e | 0 | 8 |
| B-13 | a | 0.5 | 10 |
| | b | 0.5 | 10 |
| | c | 0.5 | 11 |
| | d | 0.5 | 11 |
| | e | 0.5 | 11 |

Heating test in atmosphere: 1100° C., 100 h in Electric furnace

Figure 2:
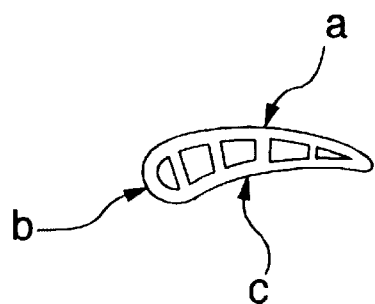
FIG. 2 is a cross-sectional view showing observed portions in a blade surface at an average size portion.
Figure 3:
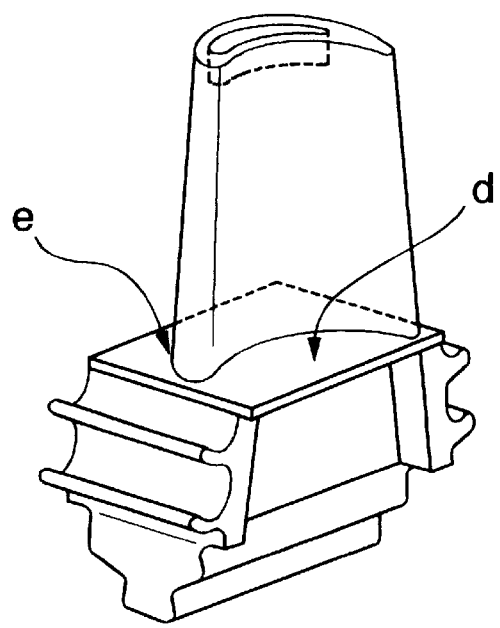
FIG. 3 is a perspective view showing observed portions in the platform of the blade.

Table 4 shows the thickness of an $Al_2O_3$ layer formed at the interface between the heat-resistant ceramic layer and the primary layer of each test blade, which thickness was measured through observation of a cross-section of the TBC of each ceramic-coated blade subjected to the test. With respect to the observed (measured) portions, Nos. a to c are portions in the blade surface at an average size portion, as shown in FIG. 2, and Nos. d and e are portions at the platform, as shown in FIG. 3.

As is clear from Table 4, in blade Nos. B-1 to B-8 of this embodiment (corresponding respectively to test piece Nos. 4, 6, 23, 27, 32, 42, 52 and 62), the thickening of the $Al_2O_3$ layer (formed at the interface) was suppressed at all of the observed portion Nos. a to e, as compared with the conventional blade Nos. B-11 and B-13 (having the ceramic layer having no addition of $Al_2O_3$, and corresponding respectively to test piece Nos. 1 and 21).

(6) Heat Cycle Test of Blades

For the same reason as described above in Item (3), a heat cycle test (involving the step of holding the blade at 1,130°

C.) was conducted. With respect to test conditions, the heating (maintained at 1,130° C. for 1 hour) in an electric furnace and the cooling outside the electric furnace were repeated, and during the cooling, compressed air was made to flow through the cooling hole in the blade, and the cooling was effected until the temperature of the blade dropped to about 200° C. Results of this test are shown in Table 5.

TABLE 5

| Blade No. | Repetition Number before damage develops in TBS |
|---|---|
| B-1 | 950 |
| B-2 | 890 |
| B-3 | 1900 |
| B-4 | 1800 |
| B-5 | 2000 |
| B-6 | 2300 |
| B-7 | 1800 |
| B-8 | 2000 |
| B-11 | 240 |
| B-13 | 350 |

"Repetition number before damage develops in TBC":
The number of cycles before a separated area of the ceramic layer exceeds 20%.

Table 5 shows the number of cycles before damage developed in the TBC of the blades. When a separated area of the heat-resistant ceramic layer exceeded 20%, it was decided that damage developed, and the repetition number so far was found. As is clear from Table 5, in the ceramic-coated blades (Nos. B-1 to B-8) of this embodiment having the heat-resistant ceramic layer containing 5 to 50 wt. % $Al_2O_3$, the repetition number before the development of damage in the TBC is much larger as compared with the conventional blades (Nos. B-11 and B-13), and the durability of the blades of this embodiment, having the ceramic layer of the columnar structure, is 5 to 9 times larger, and the durability of the blade of this embodiment, having the ceramic layer of the porous structure, is 4 to 6 times larger.

This heat cycle test including the holding thereof at 1,130° C. is an accelerated one of the heat cycle test for the TBCs in Item (3) involving the holding at 1,050° C., and in this heat cycle test, the results similar to those of the heat cycle test (1.050° C.) were obtained. Therefore, it can be readily surmised that a ceramic-coated blade, having any of the TBCs of the invention shown in Table 2, can exhibit the excellent durability as shown in Table 5. It can also be readily surmised that the ceramic-coated blades of this embodiment can exhibit the excellent durability as shown in Table 2 for a 1,050° C. class test.

(7) Effects of Blades of this Embodiment

As is clear from the study of the above Items (1) to (6), in the ceramic-coated blades of this embodiment for the gas turbine, the oxygen ion conductivity of the partially-stabilized $ZrO_2$ ceramic at high temperatures can be greatly reduced without affecting the other properties of the $ZrO_2$ ceramic. Therefore, when the blade of this embodiment is used in a power-generating gas turbine which is operated at high temperatures for a longer period of time as compared with an engine for an airplane, the thickening of the $Al_2O_3$ layer due to the accelerated oxidation of the primary layer (which is caused by the oxygen ion conductivity of the heat-resistant ceramic at high temperatures) at the interface between the heat-resistant ceramic layer and the primary layer (composed of MCrAlY alloy), which is the greatest problem with the known partially-stabilized or stabilized ceramic, can be sufficiently prevented for a long period of time, and the separation of the ceramic layer due to damage, developing in the vicinity of the interface because of the thickened $Al_2O_3$ layer, can be positively prevented. Therefore, the excellent durability can be achieved even under long-term, high-temperature operating conditions. Therefore, the temperature of the metal substrate of the blade can be lowered while sufficiently maintaining the thermal barrier effect (which is the originally-intended purpose), and by doing so, the reliability of the part can be enhanced, and its lifetime can be prolonged. Besides, since the thermal barrier effect can be obtained stably, the amount of the cooling medium (e.g. air) for cooling the gas turbine blades can be reduced, and therefore the power-generating efficiency of the turbine can be enhanced.

Particularly, in a heat-resistant ceramic layer comprising ceramic of a columnar structure having an excellent thermal stress relaxation effect, since there are less grain boundaries and defects in the direction of the thickness of the heat-resistant ceramic layer, the oxygen ion conductivity of the ceramic layer is high, and the oxidation reaction at the interface between the ceramic layer and the primary layer is apt to be promoted, so that the $Al_2O_3$ layer is thickened, and as a result there is a possibility that the high-temperature durability of the TBC and hence the high-temperature durability of the blade are lowered. However, in the blade of this embodiment, the thickening of the $Al_2O_3$ layer at the interface can be prevented, and therefore the thermal stress relaxation effect of the ceramic layer can be fully achieved, and the blade of this embodiment is suited as a part of a high-temperature gas turbine exposed to a severe thermal environment, and can be used for a long period of time.

(7-1) Second Embodiment

In this embodiment, as ion-conductive ceramic, other $ZrO_2$ ceramics than $ZrO_2$-8 wt. % $Y_2O_3$, were used. The same parts as those of the first embodiment will be designated by identical reference numerals.

The procedure of preparing blades of this embodiment, having a TBC of a porous structure by plasma spraying, and the procedure of preparing blades of this embodiment, having a TBC of a columnar structure by electron beam deposition, will be described separately from each other.

(A) Blades having TBC of Porous Structure by Plasma Spraying

In this case, under the same conditions as in the first embodiment, a primary layer (having the same specification as in the first embodiment), made of CoNiCrAlY alloy, is formed on a blade portion 11 and a platform portion 12 (see FIG. 1) (both made of a heat-resistant Ni base alloy (Rene'-80) as in the first embodiment) by plasma spraying in a reduced pressure atmosphere.

Thereafter, by using powder formed by adding 10% $Al_2O_3$ to $ZrO_2$-12% $Y_2O_3$, powder formed by adding 10% $Al_2O_3$ to $ZrO_2$-17% $CeO_2$, powder formed by adding 10% $Al_2O_3$ to $ZrO_2$-8% CaO, and powder formed by adding 10% $Al_2O_3$ to $ZrO_2$-24% MgO, ceramic layers were formed by plasma spraying as in the first embodiment. For comparison purposes, there were also prepared blades having respective heat-resistant ceramic layers composed respectively of insulative ceramics ($ZrO_2$-12% $Y_2O_3$, $ZrO_2$-17% $CeO_2$, $ZrO_2$-8% CaO and $ZrO_2$-24% MgO) similar in composition to the above four ceramics, but containing no $Al_2O_3$.

A high-temperature heating test in the atmosphere as in the above Item (5) of the first embodiment was conducted for the ceramic-coated blades of this embodiment and the comparison blades, and through observation of a cross-section of each TBC after the test, the thickness of an $Al_2O_3$ layer at the interface between the heat-resistant ceramic layer and the primary layer was examined. As a result, in the TBCs of the blades of this embodiment, the thickness of the $Al_2O_3$ layer was 4 to 5 $\mu$m, and in the TBCs (comprising the heat-resistant ceramic layer without the addition of $Al_2O_3$) of the comparison blades, the thickness of the $Al_2O_3$ layer was 8 $\mu$m.

A heat cycle test, involving the step of holding them at 1,130° C. as in the above Item (6) of the first embodiment, was conducted, and the number of cycles before damage developed in the TBCs of the blades of this embodiment was about five times larger as compared with the comparison blades, and it became clear that the blades of this embodiment had the excellent high-temperature durability.

(B) Blades having TBC of Columnar Structure by Electron Beam Deposition

By using the above-mentioned $ZrO_2$ ceramics having 10% $Al_2O_3$ added thereto as a raw material, heat-resistant ceramic layers were formed by electron beam deposition as in the first embodiment, thereby preparing ceramic-coated blades of this embodiment. In this case, the surface roughness of the primary layer was Rmax. 10 $\mu$m, and before the formation of the heat-resistant ceramic layer, an $Al_2O_3$ layer having a thickness of 0.5 $\mu$m was formed on the surface of the primary layer as in the first embodiment. For comparison purposes, by using the $ZrO_2$ ceramics containing no $Al_2O_3$ as a raw material, heat-resistant ceramic layers were formed by electron beam deposition under the same conditions, thereby preparing ceramic-coated blades. In the ceramic-coated blades of this embodiment and the comparison ceramic-coated blades, their heat-resistant ceramic layers had a columnar structure in which a columnar structure of several $\mu$m was grown in a direction of the thickness of the coating.

A high-temperature heating test as in the above Item (5) of the first embodiment and a heat cycle test including the holding of the blades at 1,130° C. as in the above Item (6) of the first embodiment, were conducted for these ceramic-coated blades. A cross-section of each TBC was observed after the high-temperature heating test, and as a result in the ceramic-coated blades of this embodiment, the thickness of an $Al_2O_3$ layer at the interface between the heat-resistant ceramic layer and the primary layer was 4 to 5 $\mu$m, and in the comparison ceramic-coated blades, the thickness of an $Al_2O_3$ layer was 9 to 11 $\mu$m. Results of the heat cycle test including the holding at 1,130° C. indicated that the number of cycles before damage developed in the TBCs of the blades of this embodiment was about seven times larger as compared with the comparison blades. Therefore, from these results, it has become clear that the ceramic-coated blades of this embodiment, like the ceramic-coated blades of the first embodiment, have the excellent high-temperature durability (7-2) Third Embodiment In this embodiment, other insulative ceramics than $Al_2O_3$ were added to a heat-resistant layer. The same parts as those of the first and second embodiments will be designated by identical reference numerals.

Blades of this embodiment were prepared according to the following procedure.

Namely, by using the same method as in the first embodiment, a primary layer made of CoNiCrAlY alloy was formed on a blade portion 11 and a platform portion 12 both made of a heat-resistant Ni base alloy (Rene'-80) as in the first embodiment. Then, using ceramic raw materials for TBCs of this embodiment which were formed by adding 15% of an insulative material to partially-stabilized $ZrO_2$ ceramic ($ZrO_2$-8% $Y_2O_3$), heat-resistant ceramic layers of a columnar structure were formed by electron beam vapour deposition as in the first embodiment. The insulative materials used were $HfO_2$, $Hf_2O_2$, $SiO_2$, MgO (all of which are oxides), AlN, BN and $Si_3N_4$ (all of which are nitrides). The surface roughness of the primary layer was Rmax. 10 $\mu$m, and an $Al_2O_3$ layer having a thickness of 0.5 $\mu$m was formed on the surface of the primary layer. The thickness of the heat-resistant ceramic layer was about 150 $\mu$m. As a result of observation of a cross-section of each TBC, their heat-resistant ceramic layers had a columnar structure in which a columnar structure of several $\mu$m was grown in a direction of the thickness of the coating.

Evaluation tests as in the first embodiment were conducted for these ceramic-coated blades of this embodiment. As a result, an observation of a cross-section after a high-temperature heating test indicated that the thickness of an $Al_2O_3$ layer at the interface between the heat-resistant ceramic layer and the primary layer was 2 to 4 $\mu$m, and in a heat cycle test including the step of holding at 1,130° C. the number of cycles before damage developed in the TBC was in the range of from 1,600 to 2,200. Therefore, it became clear that the ceramic-coated blades of this embodiment were more excellent in high-temperature durability as compared with the compression ceramic-coated blades of the first embodiment. Namely, in this embodiment, the effects similar to those of the first embodiment were also obtained.

(7-3) Fourth Embodiment

In this embodiment, a different kind of alloy was used as a substrate of a blade. The same parts as those of the 1st to 3rd embodiments will be designated by identical reference numerals.

Blades of this embodiment were prepared according to the following procedure.

Namely, a heat-resistant Ni base alloy (CMSX-4 (monocrystal alloy): Ni-6.6% Cr-0.6% Mo-6.4% W-3.0% Re-5.6% Al-1.0% Ti-6.5% Ta-9.6% Co) was used as a main material for the blade, and as in the first embodiment, a primary layer (of NiCoCrAlY (Ni-23% Co-17% Cr-12% Al-0.5% Y) was formed on a blade portion 11 and a platform portion 12, and further using $ZrO_2$-8% $Y_2O_3$-10% $Al_2O_3$ as a raw material, a heat-resistant ceramic layer was formed by electron beam vapour deposition as in the first embodiment. In this case, the surface roughness of the primary layer was Rmax. 10 $\mu$m, and before the formation of the heat-resistant ceramic layer, an $Al_2O_3$ layer having a thickness of 1 $\mu$m was formed on the surface of the primary layer. The heat-resistant ceramic layer had a columnar structure in which a columnar structure with a width of several $\mu$m was grown in a direction of the thickness of the coating, and the thickness of the heat-resistant ceramic layer was 200 $\mu$m.

Evaluation tests as in the first embodiment were conducted for the ceramic-coated blade of this embodiment. As a result, an observation of a cross-section after a high-temperature heating test indicated that the thickness of an $Al_2O_3$ layer at the interface between the heat-resistant ceramic layer and the primary layer was 3 $\mu$m, and in a heat cycle test including the holding at 1,130° C. the number of cycles before damage developed in the TBC was 2,000. Therefore, it became clear that the ceramic-coated blade of this embodiment was more excellent in high-temperature durability as compared with the comparison ceramic-coated blades of the first embodiment. Namely, in this embodiment, the effects similar to those of the first embodiment were able to be obtained.

(7-4) Fifth Embodiment

In this embodiment, a different kind of alloy was used as a substrate of a blade.

Blades of this embodiment were prepared according to the following procedure.

Namely, a heat-resistant Ni base alloy (Mar-M247 (unidirectionally-solidified material): Ni-16% Cr-1.8% Mo-2.6% W-3.4% Al-3.4% Ti-1.7% Ta-8.5% Co-0.1% C) was used as a main material for the blade, and as in the first embodiment, a primary layer (of NiCoCrAlY (Ni-30% Co-20% Cr-8% Al-0.5% Y) was formed on a blade portion 11 and a platform portion 12, and further using $ZrO_2$-12% $Y_2O_3$-5% $Al_2O_3$ as a raw material, a heat-resistant ceramic layer having a thickness of about 200 μm was formed by a combination of electron beam vapour deposition and ion beam irradiation as in the first embodiment. In this case, the surface roughness of the primary layer was Rmax. 10 μm, and before the formation of the heat-resistant ceramic layer, an $Al_2O_3$ layer having a thickness of 0.5 μm was formed on the surface of the primary layer. The heat-resistant ceramic layer had a columnar structure in which a columnar structure with a width of several μm was grown in a direction of the thickness of the coating.

Evaluation tests as in the first embodiment were conducted for the ceramic-coated blade of this embodiment. As a result, an observation of a cross-section after a high-temperature heating test indicated that the thickness of an $Al_2O_3$ layer at the interface between the heat-resistant ceramic layer and the primary layer was 4 μm, and in a heat cycle test including the holding at 1,130° C., the number of cycles before damage developed in the TBC was 2,100. Therefore, it became clear that the ceramic-coated blade of this embodiment was more excellent in high-temperature durability as compared with the comparison ceramic-coated blades of the first embodiment. Namely, in this embodiment, the effects similar to those of the first embodiment were able to be obtained.

(7-5)

In the above 1st to 5th embodiments of the invention, although the blades had the TBC of a two-layer construction comprising the heat-resistant ceramic layer and the primary layer, the invention is not limited to such blades. For example, the invention may be applied to a blade having a TBC in which an intermediate layer for the purpose of thermal stress relaxation (or high-temperature oxidation and corrosion resistance) is provided between the heat-resistant ceramic layer and the primary layer, and also to a blade having a TBC in which an additional layer for the purpose of high-temperature oxidation and corrosion resistance is formed on the surface of the primary layer. In these cases, the oxidation, caused by the supply of oxygen to the primary layer because of the oxygen ion conductivity of the $ZrO_2$ ceramic layer, is a common problem, and therefore the heat-resistant ceramic layer of the invention effectively prevents the oxidation of the primary layer from being promoted, and therefore greatly contributes to the enhancement of the high-temperature durability of the blade having the TBC.

In the present invention, the oxygen ion conductivity of at least partially-stabilized $ZrO_2$ ceramic (stabilized $ZrO_2$ or partially-stabilized $ZrO_2$) at high temperatures can be greatly reduced without affecting the other properties of the $ZrO_2$ ceramic. Therefore, when the blade of this embodiment is used in a power-generating gas turbine which is operated at high temperatures for a longer period of time as compared with an engine for an airplane, the thickening of the $Al_2O_3$ layer due to the accelerated oxidation of the primary layer (which is caused by the oxygen ion conductivity of the heat-resistant ceramic at high temperatures) at the interface between the heat-resistant ceramic layer and the primary layer (made of MCrAlY alloy), which is the greatest problem with the known partially-stabilized or stabilized ceramic, can be sufficiently prevented for a long period of time, and the separation of the ceramic layer due to damage, developing in the vicinity of the interface because of the thickened $Al_2O_3$ layer, can be positively prevented. Therefore, the excellent durability can be achieved even under long-term, high-temperature operating conditions. Therefore, the temperature of the metal substrate of the blade can be lowered while sufficiently maintaining the thermal barrier effect (which is the originally-intended purpose), and by doing so, the reliability of the part can be enhanced, and its lifetime can be prolonged. Besides, since the thermal barrier effect can be obtained stably, the amount of the cooling medium (e.g. air) for cooling the gas turbine blades can be reduced, and therefore the power-generating efficiency of the turbine can be enhanced.

What is claimed is:

1. A ceramic-coated blade of a gas turbine comprising a substrate made of a heat-resistant alloy containing Ni as a main component, an alloy coating layer of MCrAlY alloy which is formed on a surface of said substrate and which MCrAlY has high-temperature oxidation and corrosion resistance superior to said heat-resistant alloy, and in which MCrAlY, M is at least one selected from the group consisting of Co, Ni, and Fe, and a heat-resistant ceramic layer formed on said alloy coating layer, said heat-resistant ceramic layer being a mixture of ion-conductive ceramic, which ion-conductive ceramic is composed of at least partially-stabilized $ZrO_2$-based ceramic, and insulative ceramic, and said mixture being provided with a columnar structure in which columnar crystals are grown in a direction of a thickness of the coating, and said insulative ceramic being composed of at least one selected from the group consisting of $Al_2O_3$, $SiO_2$, $Hf_2O_3$, BN, AlN and $Si_3N_4$, the content of which insulative ceramic in said heat resistant ceramic layer is in a range of 5 wt. % to 50 wt. %.

2. A ceramic-coated blade according to claim 1, in which said ion-conductive ceramic contains $ZrO_2$ as a main component, and further contains at least one selected from the group consisting of $Y_2O_3$, CaO, $CeO_2$ and MgO.

3. A ceramic-coated blade according to claim 2, in which the amount of said at least one selected from the group consisting of $Y_2O_3$, CaO, $CeO_2$ and MgO is 4 to 12 wt. % with respect to the whole of said ion-conductive ceramic.

* * * * *